Oct. 16, 1956        J. F. SMITH        2,767,385
ECHO DEPTH SOUNDING APPARATUS
Filed March 4, 1950        4 Sheets-Sheet 1
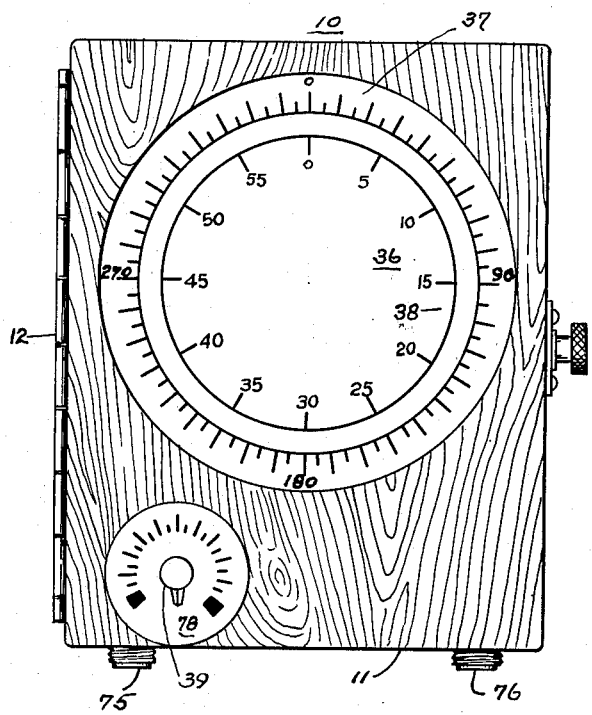
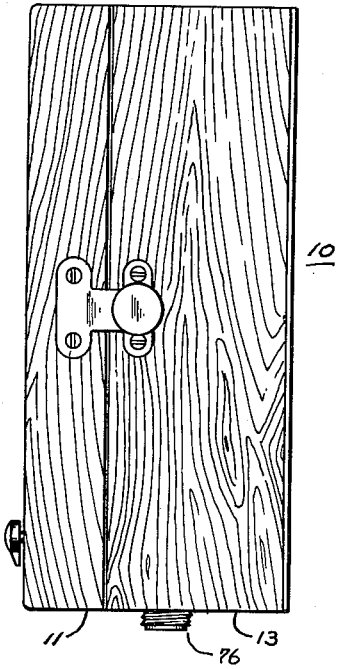
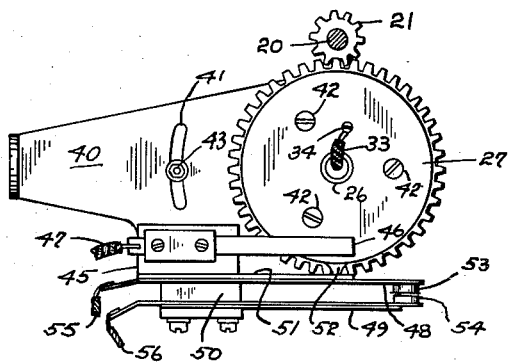
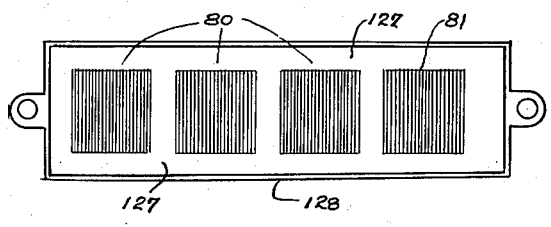
INVENTOR.
John F. Smith
BY
Robert J. Palmer
Attorney

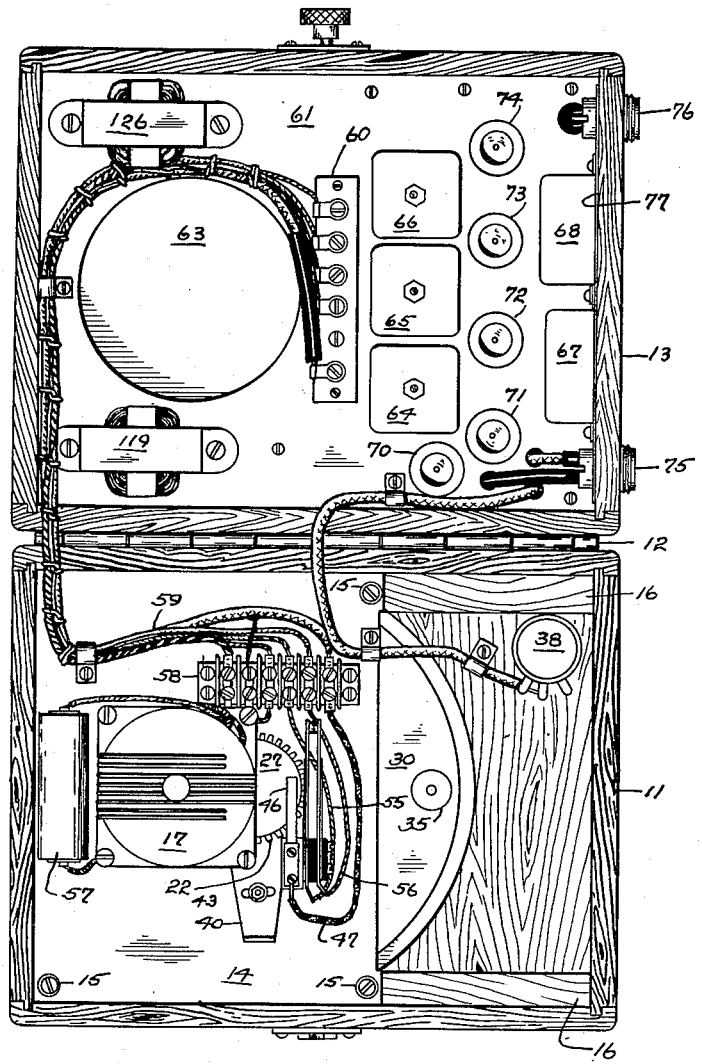

Oct. 16, 1956        J. F. SMITH        2,767,385
ECHO DEPTH SOUNDING APPARATUS

Filed March 4, 1950        4 Sheets-Sheet 3

INVENTOR.
John F. Smith
BY Robert J. Palmer
Attorney

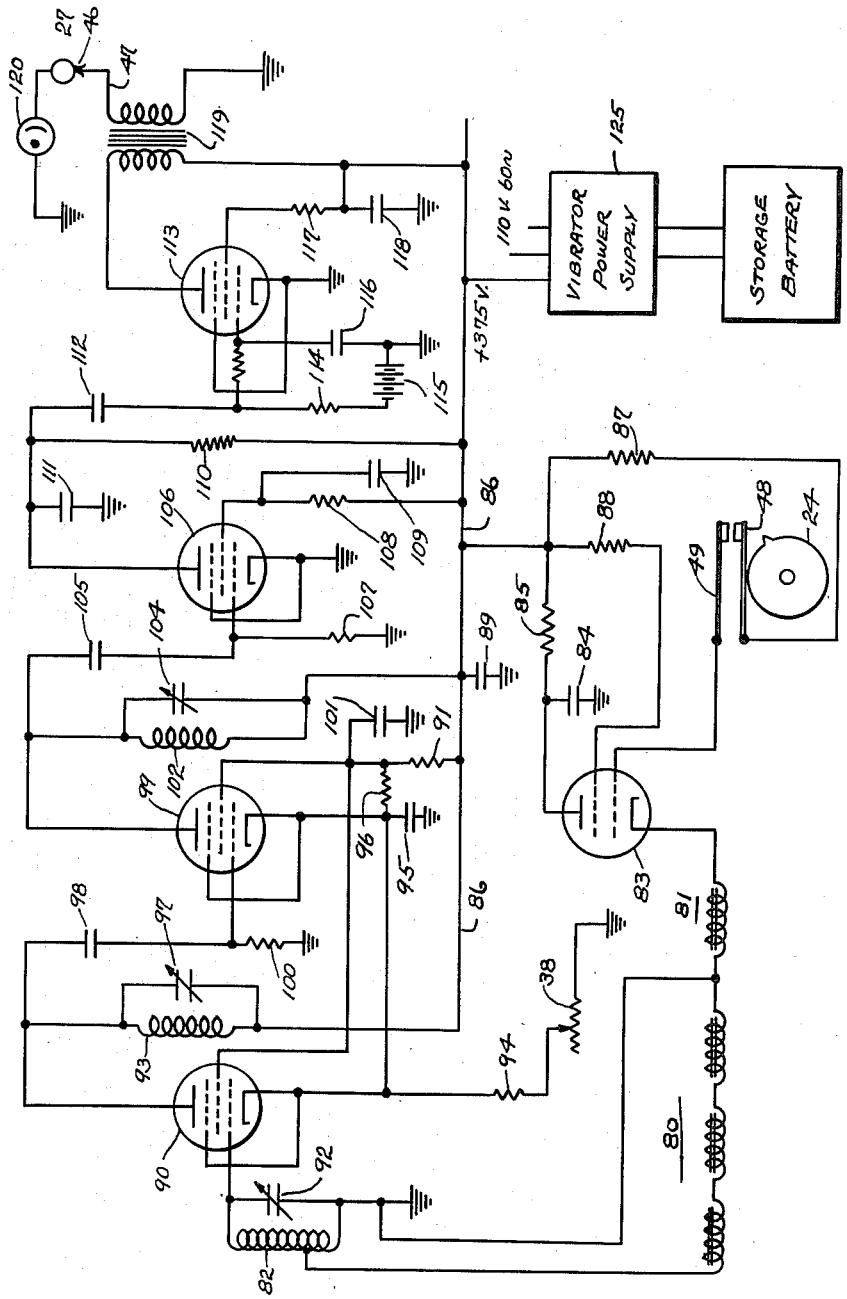

United States Patent Office 2,767,385
Patented Oct. 16, 1956

2,767,385

ECHO DEPTH SOUNDING APPARATUS

John F. Smith, Quincy, Mass., assignor to Wilfrid O. White & Sons, Inc., Boston, Mass., a corporation of Massachusetts Application March 4, 1950, Serial No. 147,693

3 Claims. (Cl. 340—3)

This invention relates to echo depth sounders, and has as objects to decrease the cost and size of such depth sounders, and to improve their appearance and performance.

Echo depth sounders of the type which transmit supersonic waves to the bottom of a body of water and which indicate the depth of the water by the reception of reflected waves, are in common use. However, such depth sounders have, in the past, been so elaborate, complicated and bulky that they have not been suitable for small pleasure and commercial boats.

This invention provides an efficient, relatively inexpensive, depth sounder of attractive appearance, and which occupies but a relatively small space.

In one embodiment of the invention, a magnetostriction transmitter and a separate magnetostriction receiver are resiliently supported as a single unit to the keel of a boat, both units being resonant at about 40 kilocycles. A synchronous motor rotates an indicator lamp around the periphery of a depth indicator dial, and rotates a cam which closes a circuit to bias the grid of a gaseous tube for causing it to conduct. The plate of the tube is connected to a capacitor which is charged through a resistor, and its cathode is connected through a coil around the magnetostriction transmitter, to ground. The cam closes the grid bias circuit of the tube when the indicator lamp passes the zero depth mark on the dial, so that the capacitor connected to the plate of the gas tube discharges through the tube and the coil around the transmitter, and shock excites the latter at its resonant frequency. The direct and the echo signals are picked up by the magnetostriction receiver unit and are amplified and supplied into the indicator lamp which lights up at the zero depth position behind the dial and at another position behind the dial which corresponds to the depth of the water.

A feature of the invention resides in discharging the capacitor which supplies the current to shock excite the transmitter unit, through a gaseous tube which is caused to conduct, when the indicator lamp passes the zero mark on the dial, by the application of a bias voltage between the grid and the cathode of the tube. In prior depth sounders, the capacitors which supplied the currents to excite the transmitter units, were discharged through mechanically operated switches, the contacts of which conducted the large currents involved, and which, therefore, not only had to be massive and costly, but were subject to arcing and resultant wear.

Another feature of this invention resides in supporting the indicator lamp on a circular plate which is attached to a hollow rotary shaft through which one of the current supply leads of the indicator lamp passes, the other supply lead being grounded. This eliminates the slip ring and brush used in prior depth sounders for this connection.

Another feature of this invention resides in attaching a switch operating cam coaxially to a gear rotated by a pinion gear driven by the electric motor, the axis of the cam being offset from that of the motor whereby the depth of the motor driven assembly is reduced.

Another feature of this invention resides in combining in one assembly, a relatively large gear driven by a pinion gear on the motor shaft, a switch operating cam for causing the discharge of a capacitor for shock exciting the transmitter unit, and a commutator for completing the circuit of the indicator lamp.

Another feature of this invention resides in supporting the motor and the assembly driven thereby, from a plate through which a rotary shaft extends, a relatively large gear meshed with a pinion gear on the motor shaft, and a cam attached to the relatively large gear, being attached to the shaft on one side of the plate, and a rotary support for the indicator lamp being attached to the shaft on the other side of the plate whereby the depth of the motor driven assembly is reduced.

Another feature of this invention resides in supporting the motor and the assembly driven thereby, from the cover of a box; in supporting the associated electron tubes and their components on a chassis within the body of the box, and in providing a circular aperture within the chassis within which the motor extends when the lid of the box is closed, thereby reducing the depth of the assembly.

Another feature of this invention resides in calibrating the scale of a depth sounder in 360 degrees as scales for compasses are calibrated, and in arranging that each degree of calibration represents one foot of depth. This enables one skilled in reading compasses instinctively to read depths without more than a glance at the scale.

Other features of the invention reside in supporting the magnetostriction transmitter and receiver units in alignment in a single, relatively long and relatively narrow housing for attachment to a keel of a boat, and in providing substantially more receiver than transmitter surface.

Other features and objects of the invention will be apparent from the following description taken with the drawing, of which:

Fig. 1 is a plan view looking downwardly upon the cover of a box containing the scale of a depth sounder embodying this invention;

Fig. 2 is a side elevation of the box;

Fig. 3 is a view with the cover of the box open, and shows the motor assembly secured to the cover, and the chassis on which the electronic components are assembled, within the body of the box;

Fig. 5 is an enlarged plan view of the zero adjustment lever, the gearing, the cam-opened switch, the brush and the rotary brush contacting surface for the indicating lamp lighting circuit;

Fig. 6 is a schematic of the circuit of the transmitter and receiver units, and

Fig. 7 is a plan view looking downwardly upon the active faces of the transmitter and receiver units.

Figure 4:
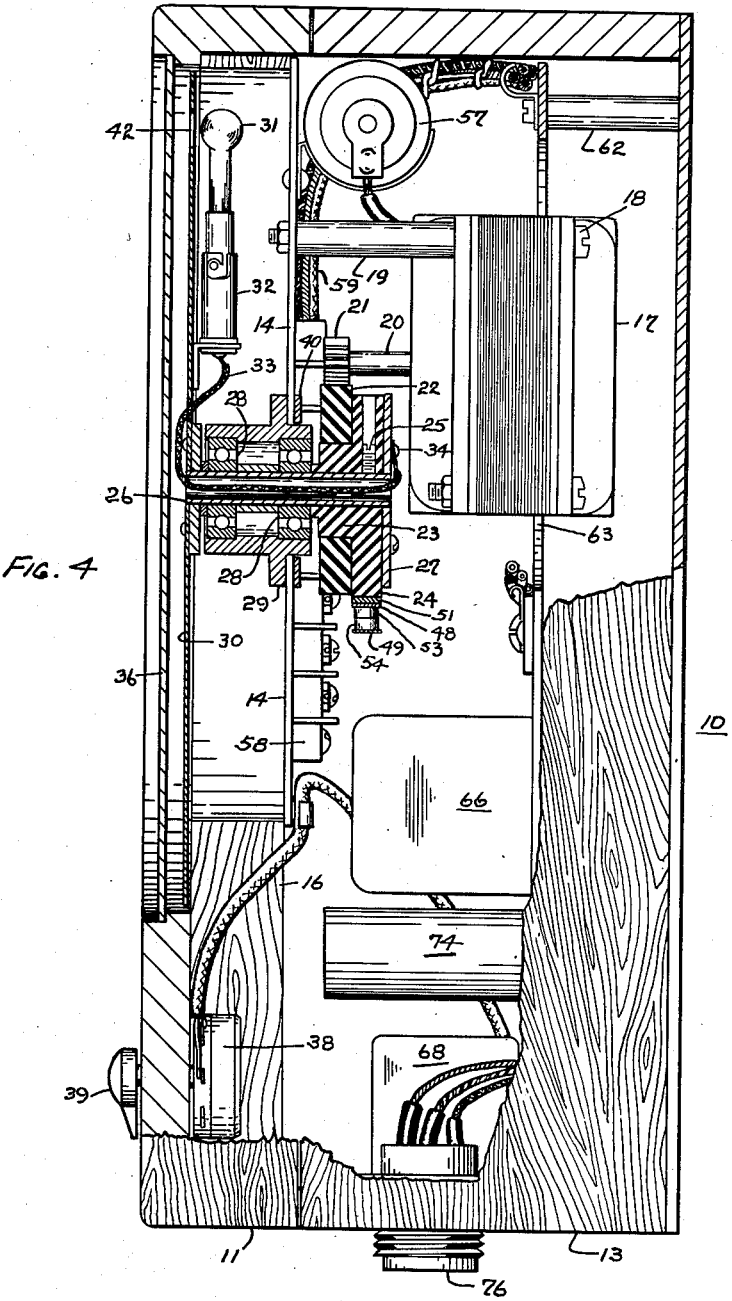
Fig. 4 is an enlarged side elevation, partially in section, of the box.

Referring first to Figs. 1–5 of the drawing, the wooden box 10 has a cover 11 hinged at 12 to the body 13. The motor-driven assembly is supported on the metal plate 14 which is attached by the screws 15 to the wooden spacers 16 which space the plate from the upper inside surface of the cover.

The synchronous motor 17 is supported on one side of the plate 14 by the bolts 18 which extend through the tubular metal spacers 19. The motor has a shaft 20 to which is attached the relatively small pinion gear 21, this shaft and gear terminating short of the plate 14. The gear 21 meshes with the relatively large rubber gear 22 which is press fitted on, and cemented to, the hub 23 of the "nylon" cam 24 which is secured by the set screw 25 to the rotary shaft 26. The circular, brass plate 27 is attached to the inner side of the cam 24.

The shaft 26 which is hollow, is held to the inner races of the ball bearings 28 which are held within the housing 29 secured to the plate 14, and which extends for the most part between the plate 14 and the rotary plate 30 which is attached to the outer end of the shaft 26.

The indicator lamp 31, which may be a "neon" lamp, is supported by the socket 32 to the circular plate 30, near the periphery thereof, a slit 42 in the plate opposite the lamp being provided for the passage of light from the lamp through the plate. One connection from the lamp is grounded to the socket, and the other connection 33 passes through the shaft 26 and is connected at 34 to the brass plate 27. The counterweight 35 is attached to the plate 30 opposite the lamp 31.

The cover 11 has a circular opening coaxial with the shaft 26, and in which is secured the glass indicator dial 36. The dial has the outer scale 37 calibrated in feet and the inner scale 38 calibrated in fathoms, the outer scale reading 360 feet and the inner scale reading 60 fathoms. The dial thus resembles that of a magnetic compass with which every boat operator is familiar, and the reading of which he is able through experience, to sense by the angular position of the compass needle. In the same way he would be able to sense the depth of the water by a quick glance at the dial 36.

The cover 11 also has the decalcomania dial 78 for the sensitivity control 38 against its outer surface below and to one side of the dial 36, and has an opening through which the shaft of the control extends, and on the outer end of which is secured the pointer 39.

The lever 40 which is pivoted to the bearing housing 29, has an insulated block 45 attached thereto, and to which is attached the brush 46 in contact with the brass plate 27 to which the live lead 33 from the indicator lamp is attached. The wire 47 attached to the brush 46 leads to the energizing circuit of the lamp as will be described in the following in connection with Fig. 6 of the drawing.

The contact arms 48 and 49 which are spaced apart by the insulating block 50 are also attached to the block 45. The inner arm 48 has a strip 51 of "nylon," on its upper surface and which contacts the cam lobe 52 on the "nylon" cam 24. The control arm 48 has the contact 53 on its outer end and which is kicked downwardly against the similar contact 54 on the arm 49, by the lobe 52, once for each revolution of the cam, for closing the trigger circuit of a gaseous discharge tube as will be described in the following in connection with Fig. 6 of the drawing. The wires 55 and 56 connected to the contact arms 48 and 49 respectively, are wired in that circuit.

The lever 40 has a slot 41 therein through which extends the screw 43 which may be loosened to permit rotation of the lever for adjusting the timing of the closing of the contacts 53 and 54 if this is neecssary.

The starting capacitor 57 for the motor 17 is secured to the same side of the plate 14 as the motor. The wiring from the motor and from the brush 46 and the contact arms 48 and 49 is connected to the terminal block 58 which is connected through the cabled wiring 59 to the terminal block 60 on the chassis 61 in the body 13 of the box 10.

The chassis 61 is supported by the spacers 62 from the base of the body of the box, and has the circular opening 63 therein, into which the motor 17 extends when the cover of the box is closed. The cans 64, 65, 66, 67 and 68 for the inductors used, and the shields 70, 71, 72, 73 and 74 for the vacuum tubes used, extend from the upper surface of the chassis alongside the motor 17.

The sockets 75 and 76 are attached to the up-turned lower end 77 of the chassis, and extend through openings in the lower side of the box. Wiring from the electrical components in the box, is connected to prongs on the sockets and through plugs screwed onto same, to the external power supply unit and the magnetostriction transmitter and receiver units.

By loosening the chassis retaining screws, the chassis can be removed by lifting its upper end and sliding the sockets 75 and 76 inwardly to clear the openings therefor in the box, and placed upside down upon the open cover of the box with the opening 63 around the motor 17 which centers the chassis and holds it on the underside of the cover. This permits checking of the wiring and of the components mounted, as is conventional, on the underside of the chassis.

The electrical circuit of the depth sounder will now be described with reference to Fig. 6 of the drawing.

The magnetostriction receiver unit 80 is connected in series with the transmitter unit 81, the receiver unit being connected at one end to ground and at the other end to a tap on the grid inductor 82. One end of the transmitter unit, that end connected to the receiver unit, is connected to ground through a conductor common to both, and its other end is connected to the cathode of the gaseous discharge tube 83.

The plate of the tube 83 is connected through the capacitor 84 to ground, and through the resistor 85 to the plate and screen voltage supply bus 86 which is connected through the capacitor 89 to ground. The resistor 87 is connected to the resistor 85 and to the contact arm 48. The resistor 88 is connected to the bus 86 and to the "keep alive" grid of the tube 83. The trigger grid of the tube 83 is connected to the contact arm 49. The grid inductor 82 is connected at one end to ground and at its other end to the control grid of the pentode, amplifier tube 90, the suppressor grid of which is connected to its cathode, and the screen grid of which is connected through the resistor 91 to the bus 86. The inductor 82 is tuned by the capacitor 92 to 40 kc.

The plate of the tube 90 is connected through the inductor 93 to the bus 86. Its cathode is connected through the resistor 94 to the slider of the sensitivity control resistor 38 which is connected at one end to ground. The cathode of the tube 90 is also connected through the capacitor 95 to ground, and through the resistor 96 to the resistor 91. The capacitor 97 tunes the inductor 93 to 40 kc.

The plate of the tube 90 is connected through the coupling capacitor 98 to the control grid of the pentode, amplifier tube 99 which is connected through the grid resistor 100 to ground. The screen grid of the tube 99 is connected to the screen grid of the tube 90 and through the capacitor 101 to ground. Its plate is connected through the inductor 102 to the bus 86. The inductor 102 is tuned by the capacitor 104 to 40 kc.

The plate of the tube 99 is also connected through the coupling capacitor 105 to the control grid of the pentode amplifier tube 106, which is connected through the grid resistor 107 to ground. The screen grid of the tube 106 is connected through the resistor 108 to the bus 86, and through the capacitor 109 to ground. The cathode of the tube 106 is grounded and its plate is connected through the resistor 110 to the bus 86 and through the capacitor 111 to ground.

The plate of the tube 106 is also connected through the coupling capacitor 112 to the control grid of the pentode tube 113, which grid is connected through the grid resistor 114 to the negative side of the bias voltage source 115, the positive side of which is connected to ground, and through the capacitor 116 to the control grid of the tube 113. The cathode of the tube 113 is grounded; its screen grid is connected through the resistor 117 to the bus 86, and through the capacitor 118 to ground. The plate of the tube 113 is connected through the primary winding of the step-up transformer 119 to the bus 86. The secondary winding of the transformer is connected to the indicator lamp 120 which may be a "neon" lamp.

The tubes 90 and 99 are biased to operate as Class A amplifiers. The tube 106 is biased normally substantially to saturation whereby it draws large plate current, thereby reducing through the voltage drop in the load resistor 110, its plate voltage to a relatively low value. The tube 113 is normally biased to cut-off.

In operation, as the cam 24 is operated by the motor 17, it periodically kicks the contact arm 48 towards the contact arm 49 causing the contacts carried by these arms to touch and to complete the circuit connecting the trigger grid of the discharge tube 83 to the bus 86 thereby charging it positively and causing the tube periodically to conduct.

When the tube 83 conducts, it discharges the capacitor 84 which has been charged from the bus 86 through the resistor 85, through the magnetostriction transmitter unit 81 to ground, causing this unit to be shock excited at its resonant frequency of 40 kc. The transmitter and receiver units are mounted on the keel of the boat as is conventional, so that the pressure waves produced by the transmitter unit are directed towards the bottom of the body of water in which the boat is located, and so that the reflected waves strike the receiver unit which also is resonant at 40 kc.

The echo voltages induced in the receiver unit are amplified by the tubes 90 and 99 resulting in so high a voltage during the negative half-cycles, at the control grid of the tube 106, that the current drawn by the tube sharply decreases. This results in an increase in its plate voltage and in the voltage delivered to the control grid of the tube 113 causing this tube to conduct and to cause a voltage to be induced in the secondary winding of the transformer 119 sufficient to ignite the lamp 31.

The lamp 31 is being rotated while this is happening and lights up at a location behind the dial corresponding to the depth of the water in which the boat is located, whereby the depth can be read from the scales or sensed by one accustomed to reading compasses.

The synchronous motor and the electronic components described in the foregoing, may be energized through the conventional vibrator type power supply unit 125 from the storage battery or batteries used on a boat. Such a unit delivers 115 volt, 60 cycle, alternating current which rotates the motor at the constant speed of 1800 revolutions per minute. The power supply unit also supplies current to light the filaments of the vacuum tubes and the plate, screen and bias voltages. The filaments of the tubes are energized from the filament transformer 126, the primary winding of which is energized by the unit 125.

The gearing provides a 4.5 to 1 speed reduction so that the lamp 31 is rotated at 400 R. P. M. The velocity of sound in water is approximately 4800 feet per second. The time required for a pressure wave from the transmitter to travel to sea bottom and for the echo to return, is one second for 2400 feet depth. The speed of the indicator lamp is 400 R. P. M. or 6.666 R. P. S. 2400 divided by 6.666=360. The scale of the indicator dial is thus graduated to read 360 feet or 60 fathoms.

Another feature of the invention resides in the construction of the magnetostriction transmitter and receiver units. As illustrated by Fig. 7 of the drawing, the transmitter unit 81 comprises a block of nickel laminations resiliently supported in the body 127 of synthetic rubber, in the relatively long and relatively narrow housing 128. The receiver unit 80 comprises three such blocks of nickel laminations spaced from each other and from the transmitter block and in alignment therewith, the receiver blocks also being resiliently supported in the synthetic rubber body 127. The receiver blocks thus have three times the surface of the transmitter, thus providing increased response to the relatively weak echo signals.

Still another feature of the invention resides in the cam operated switch construction. The cam lobe does not touch the contact arm 48 when the contacts on it and the contact arm 49 make contact, but, instead, kicks the arm 48 towards the arm 49 and then moves from it before the contacts touch, the momentum of the arm 48 causing it to continue moving until its contact touches the contact on the arm 49. This provides the desired quick make and break. This is severe treatment of the arm 48 which would be badly damaged after several thousands of operating cycles were it not for the protective strip of "nylon" on this arm which is kicked by the cam lobe and which absorbs the shocks of the kicks. Very quiet operation also results.

While one embodiment of the invention has been described for the purpose of illustration, it should be understood that the invention is not limited to the exact apparatus and arrangement of apparatus illustrated, since modifications therefrom may be suggested by those skilled in the art without departure from the essence of the invention.

What I claim as my invention is:

1. In an echo depth sounder having a transmitter unit; an echo receiver unit; a capacitor; a gaseous discharge tube having an anode and a cathode connected in series with said transmitter unit and capacitor, and having a trigger electrode; a constant speed motor having a rotary shaft; the combination of a relatively small pinion gear on said shaft; a relatively large gear meshed with said small gear; a cam lying coaxially against and attached to said large gear for rotation therewith; a brush contacting plate lying coaxially against and attached to said cam for rotation therewith; a hollow shaft; said large gear, said cam and said plate being assembled coaxially around and attached to said hollow shaft; an indicator lamp rotated by said hollow shaft; said lamp having an insulated circuit connection extending through said hollow shaft and attached to said plate; a brush in contact with said plate, means connected to said receiver unit for amplifying an echo signal and for using the amplified echo signal to cause said lamp to be energized; said last mentioned means including a circuit completed through said brush, said plate and said connection; contacts operated by said cam, and a trigger voltage bias source connected to said contacts and through same to said cathode and electrode for causing said tube to fire and to discharge said capacitor through said transmitter unit when said contacts are closed by said cam.

2. In an echo depth sounder having an echo receiver, an amplifier connected to said receiver, a constant speed electric motor having a rotary shaft, a relatively small pinion gear on said shaft, a relatively large gear meshed with said pinion gear, said large gear having a hollow shaft, the combination of an indicator lamp rotated by said hollow shaft, a conductor wire connected at one end to said lamp and extending through said hollow shaft, a rotary contact member rotatable with said shaft and electrically connected to the other end of said wire, a brush in contact with said member, and a circuit connecting said lamp to said amplifier for causing an amplified echo signal to light said lamp, said circuit including said wire, said contact member and said brush.

3. The invention claimed in claim 2 in which the amplifier has a metal chassis, in which the lamp is attached to a metal plate rotated by the hollow shaft, in which the lamp is connected by another conductor to the plate, in which the plate is grounded to said chassis, and in which the circuit connecting the lamp to the amplifier also includes a grounded connection connecting the amplifier to the chassis.

References Cited in the file of this patent

UNITED STATES PATENTS

| | | |
|---|---|---|
| 2,009,449 | Hedley | July 30, 1935 |
| 2,033,160 | Turner | Mar. 10, 1936 |
| 2,083,344 | Newhouse et al. | June 8, 1937 |

(Other references on following page)

| | | | | | |
|---|---|---|---|---|---|
| 2,131,993 | Wittkukus | Oct. 4, 1938 | 2,465,990 | Anderson | Apr. 5, 1949 |
| 2,346,093 | Tolson | Apr. 4, 1944 | 2,475,363 | Turner | July 5, 1949 |
| 2,370,134 | Begun | Feb. 27, 1945 | 2,644,863 | Fryklund | July 7, 1953 |
| 2,394,286 | Blaisdell | Feb. 5, 1946 | | | |
| 2,438,926 | Mott | Apr. 6, 1948 | | | |
| 2,443,177 | Beechlyn | June 15, 1948 | | | |
| 2,446,937 | Lorance | Aug. 10, 1948 | | | |
| 2,449,358 | Zappacosta | Sept. 14, 1948 | | | |

OTHER REFERENCES

Article by Shaw, Electronics, September 1945, pages 88–91.

Article by Kiernan, Electronics, October 1947, pages 96–98.